(12) United States Patent
Inada (10) Patent No.: US 9,788,370 B2
(45) Date of Patent: Oct. 10, 2017

(54) LIGHT-EMITTING-DIODE-DRIVING DEVICE, LIGHTING APPARATUS FOR VEHICLE AND VEHICLE INCLUDING THE SAME

(71) Applicant: Panasonic Corporation, Osaka (JP)

(72) Inventor: Yoshiyuki Inada, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 0 days.

(21) Appl. No.: 14/314,341

(22) Filed: Jun. 25, 2014

(65) Prior Publication Data

US 2015/0015143 A1    Jan. 15, 2015

(30) Foreign Application Priority Data

Jul. 10, 2013  (JP) .................... 2013-144829

(51) Int. Cl.
*B60Q 1/14* (2006.01)
*H05B 33/08* (2006.01)
*H05B 37/02* (2006.01)

(52) U.S. Cl.
CPC ....... *H05B 33/0815* (2013.01); *H05B 33/089* (2013.01); *H05B 33/0851* (2013.01);
(Continued)

(58) Field of Classification Search
CPC .. B60Q 3/0293; B60Q 3/0259; B60Q 11/005; H05B 33/0815; H05B 33/089; H05B 33/0851; H05B 33/0884; H05B 37/02
(Continued)

(56) References Cited

U.S. PATENT DOCUMENTS 8,362,639 B2    1/2013 Nagase
2002/0005738 A1* 1/2002 Inn ................... H03F 3/345
                                                    327/51
(Continued)

FOREIGN PATENT DOCUMENTS

CN    102006698 A    4/2011
JP    2009-111035 A   5/2009

OTHER PUBLICATIONS

English Translation of Chinese Office Action dated Jan. 4, 2016 for corresponding Chinese Application No. 201410323082.3.

*Primary Examiner* — Alexander H Taningco
*Assistant Examiner* — Christian L Garcia
(74) *Attorney, Agent, or Firm* — Renner Otto Boisselle & Sklar, LLP (57) ABSTRACT

A light-emitting-diode-driving device includes a control circuit that is configured to perform constant current control with a DC-DC converter so that a value of a current detected by a current detection unit agrees with a prescribed reference current value to be supplied to a light source. The control circuit includes a reference-current-instruction unit, a threshold-voltage-setting unit, and a comparator circuit. The reference-current-instruction unit is configured to set the prescribed reference current value. The threshold-voltage-setting unit is configured to set a threshold voltage for determining a short circuit failure in the light source. The comparator circuit is configured to compare, with the threshold voltage, a value of a voltage that is detected by a voltage detection unit. The control circuit is configured to make the threshold-voltage-setting unit reduce the threshold voltage, when the reference-current-instruction unit reduces the prescribed reference current value.

14 Claims, 8 Drawing Sheets

(52) U.S. Cl.
CPC .......... *H05B 33/0884* (2013.01); *H05B 37/02* (2013.01); *Y02B 20/347* (2013.01)

(58) Field of Classification Search
USPC ..... 315/77, 82, 291, 307, 76, 10.8; 362/487, 362/545; 361/86, 87
See application file for complete search history.

(56) References Cited

U.S. PATENT DOCUMENTS

| | | | |
|---|---|---|---|
| 2009/0161389 A1* | 6/2009 | Chen ....................... | H02M 1/36 363/16 |
| 2010/0004885 A1* | 1/2010 | Nakanishi ............. | B60L 3/0046 702/63 |
| 2010/0225235 A1* | 9/2010 | Nagase .............. | H05B 33/0815 315/130 |
| 2013/0207548 A1* | 8/2013 | Leshniak ........... | H05B 33/0803 315/121 |

* cited by examiner

LIGHT-EMITTING-DIODE-DRIVING DEVICE, LIGHTING APPARATUS FOR VEHICLE AND VEHICLE INCLUDING THE SAME

CROSS REFERENCE TO RELATED APPLICATIONS

This application claims the benefit of priority to Japanese Patent Application No. 2013-144829 filed on Jul. 10, 2013, the entire contents of which are incorporated by reference herein.

TECHNICAL FIELD

The disclosure relates to a light-emitting-diode-driving device configured to perform lighting drive of a light source including a light emitting diode, a lighting apparatus for vehicle and a vehicle including the light-emitting-diode-driving device.

BACKGROUND ART

Recently, a lighting apparatus for vehicle is increasingly utilized, in which a light emitting diode is used for a light source, such as a vehicle headlight, a vehicle interior lamp, a vehicle taillight, an auxiliary lamp or a daytime running light. The lighting apparatus for vehicle is configured to make a light-emitting-diode-driving device perform lighting drive of the light source including the light emitting diode.

Figure 14:
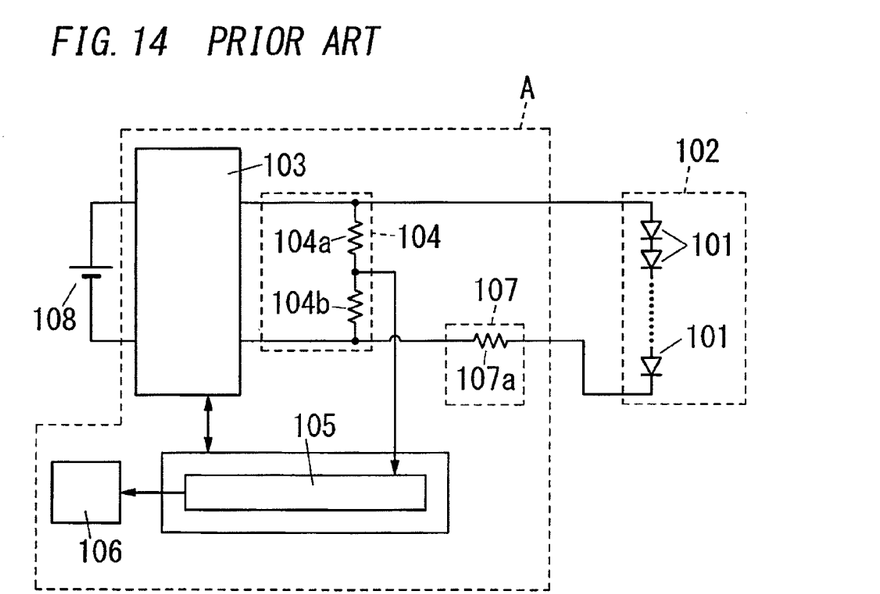
FIG. 14 is a drawing illustrating a schematic circuit configuration of a conventional light-emitting-diode-driving device.

As this type of light-emitting-diode-driving device, there has been known one example shown in FIG. 14, which includes a failure determination circuit 105 configured to determine presence or absence of a short circuit in a light source 102 (e.g., see JP2009-111035A (hereinafter, referred to as a "document 1")).

A light-emitting-diode-driving device A in the document 1 includes a driving circuit 103 configured to convert electric power supplied from a power supply 108, and output a boosted DC voltage. The driving circuit 103 is configured to apply the boosted DC voltage to the light source 102, in which a plurality of light emitting diodes 101 are connected in series, to turn on the light source 102. The light-emitting-diode-driving device A further includes a voltage detection circuit 104 configured to detect a voltage across the light source 102. The voltage detection circuit 104 is configured to detect the voltage across the light source 102 with voltage detection resistors 104a and 104b that are connected in series to each other and are connected in parallel to the light source 102. The driving circuit 103 is configured to keep electric power to be supplied to the light source 102 at prescribed constant electric power by performing PWM (Pulse Width Modulation) control. The light-emitting-diode-driving device A further includes a current detection circuit 107 configured to detect, with a current detection resistor 107a, a current flowing through the light source 102. Further, the light-emitting-diode-driving device A includes a display unit 106 configured to display a result of presence or absence of a short circuit in the light source 102, determined by the failure determination circuit 105.

Here, this type of light-emitting-diode-driving device is required to detect more accurately a short circuit failure in a light source including a light emitting diode. However, such a requirement is not satisfied only with the configuration of the light-emitting-diode-driving device in the document 1. Therefore, this type of light-emitting-diode-driving device is required to be further improved.

SUMMARY OF THE INVENTION

It is an object of the present technology to provide a light-emitting-diode-driving device which can detect more accurately a short circuit failure in a light source including a light emitting diode, a lighting apparatus for vehicle and a vehicle including the same.

A light-emitting-diode-driving device according to an aspect of the present invention includes a DC-DC converter, a current detection unit, and a control circuit. The DC-DC converter is configured to convert, into a prescribed DC voltage, a DC voltage that is supplied from a DC power supply, and apply the prescribed DC voltage to a light source including a light emitting diode. The current detection unit is configured to detect a current that flows through the light source. The control circuit is configured to perform constant current control with the DC-DC converter so that a value of the current detected by the current detection unit agrees with a prescribed reference current value to be supplied to the light source. The control circuit includes a reference-current-instruction unit, a threshold-voltage-setting unit, and a comparator circuit. The reference-current-instruction unit is configured to set the prescribed reference current value to be supplied to the light source. The threshold-voltage-setting unit is configured to set a threshold voltage for determining a short circuit failure in the light source. The comparator circuit is configured to compare, with the threshold voltage, a value of a voltage across the light source that is detected by a voltage detection unit. The control circuit is configured to make the threshold-voltage-setting unit reduce the threshold voltage, when the reference-current-instruction unit reduces the prescribed reference current value.

A lighting apparatus for vehicle according to an aspect of the present invention includes: a light emitting diode; and the above-mentioned light-emitting-diode-driving device that is configured to turn on the light emitting diode as the light source.

A vehicle according to an aspect of the present invention includes: a light emitting diode; the above-mentioned light-emitting-diode-driving device that is configured to turn on the light emitting diode as the light source; and a vehicle body in which the light emitting diode and the light-emitting-diode-driving device are provided.

BRIEF DESCRIPTION OF THE DRAWINGS

The figures depict one or more implementations in accordance with the present teaching, by way of example only, not by way of limitations. In the figures, like reference numerals refer to the same or similar elements.

DETAILED DESCRIPTION

First Embodiment

A light-emitting-diode-driving device 10 according to the present embodiment will be described with reference to FIGS. 1 to 6.

Figure 1:
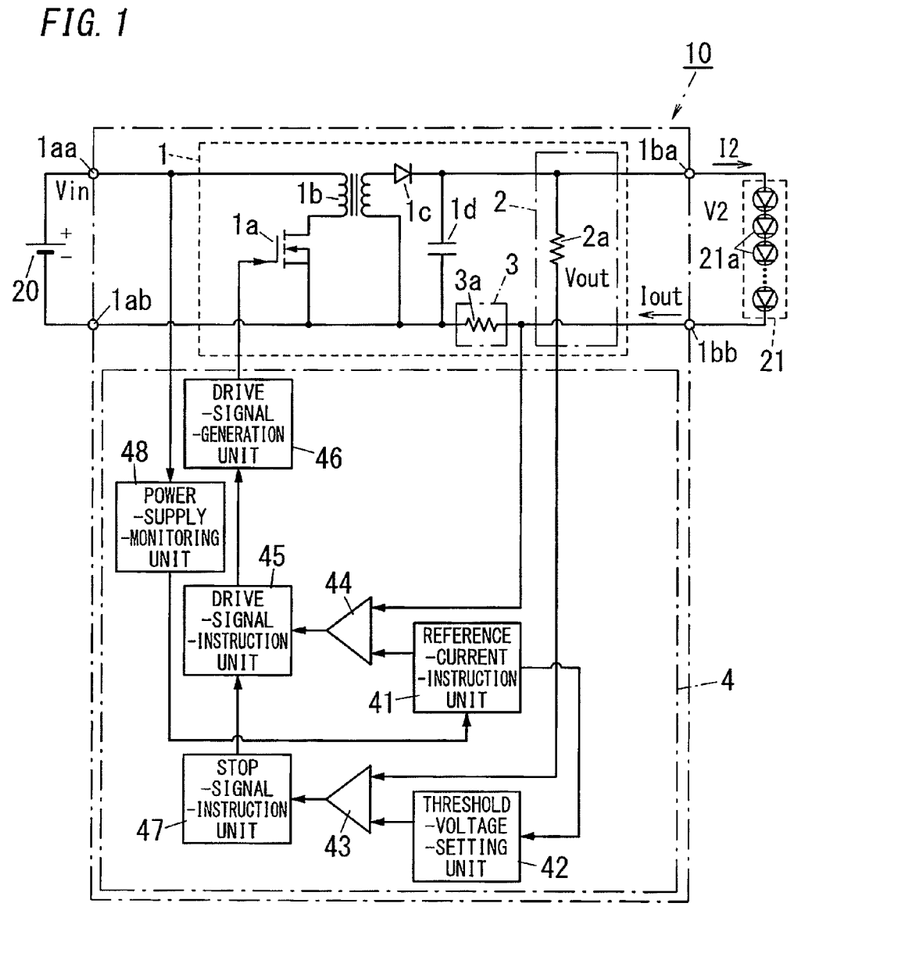
FIG. 1 is a drawing illustrating a circuit configuration of a light-emitting-diode-driving device according to First Embodiment.

As shown in FIG. 1, the light-emitting-diode-driving device 10 according to the present embodiment includes a DC-DC converter 1 which is configured to convert, into a prescribed DC voltage V2, a DC voltage $V_{in}$ that is supplied from a DC power supply 20, and apply the prescribed DC voltage V2 to a light source 21 including plural light emitting diodes 21a. The light-emitting-diode-driving device 10 further includes: a current detection unit 3 which is configured to detect a current that flows through the light source 21; and a control circuit 4 which is configured to perform constant current control with the DC-DC converter 1 so that a value $I_{out}$ of the current detected by the current detection unit 3 agrees with a prescribed reference current value to be supplied to the light source 21. The control circuit 4 includes a reference-current-instruction unit 41 which is configured to set the prescribed reference current value to be supplied to the light source 21. The control circuit 4 further includes: a threshold-voltage-setting unit 42 which is configured to set a threshold voltage for determining a short circuit failure in the light source 21; and a comparator circuit 43 which is configured to compare, with the threshold voltage set by the threshold-voltage-setting unit 42, a value $V_{out}$ of a voltage across the light source 21 that is detected by a voltage detection unit 2. The control circuit 4 is configured to make the threshold-voltage-setting unit 42 reduce the threshold voltage, when the reference-current-instruction unit 41 reduces the prescribed reference current value.

Therefore, the light-emitting-diode-driving device 10 according to the present embodiment can detect more accurately a short circuit failure in the light source 21 including the light emitting diodes 21a.

A concrete configuration of the light-emitting-diode-driving device 10 according to the present embodiment is described below.

The light-emitting-diode-driving device 10 according to the present embodiment is electrically connected to, for example, a battery that is provided in a vehicle, as the DC power supply 20. The light-emitting-diode-driving device 10 includes the DC-DC converter 1 which is configured to convert the DC voltage $V_{in}$ that is a power supply voltage supplied from the DC power supply 20 via a power supply switch (not shown), into the prescribed DC voltage V2 that is suitable for performing lighting drive of the light source 21. The light-emitting-diode-driving device 10 is electrically connected to the DC power supply 20 via input terminals 1aa and 1ab of the DC-DC converter 1. The light-emitting-diode-driving device 10 is electrically connected to the light source 21 via output terminals 1ba and 1bb of the DC-DC converter 1. The light source 21 is configured as an LED module in which the plural light emitting diodes 21a are electrically connected in series. In the light source 21, the number of light emitting diodes 21a is not limited in particular. In addition, the light source 21 is not limited to the configuration in which the plural light emitting diodes 21a are electrically connected in series, and may have a configuration in which the plural light emitting diodes 21a are electrically connected in series-parallel.

Here, a vehicle headlight is configured by the LED module in which the plural light emitting diodes 21a are electrically connected in series. A lighting apparatus for vehicle according to the present embodiment includes the LED module and the light-emitting-diode-driving device 10 configured to turn on the LED module as the light source 21.

The DC-DC converter 1 may be configured by a flyback converter for example. The DC-DC converter 1 includes a switching element 1a, such as a power MOSFET (Metal Oxide Semiconductor Field Effect Transistor) in which on/off switching is controlled through a drive signal that is output by the control circuit 4. The DC-DC converter 1 further includes a transformer 1b, which includes a primary winding on a side of the DC power supply 20 and a secondary winding on a side of the light source 21. One end of the primary winding is connected to a positive electrode of the DC power supply 20, and the other end of the primary winding is connected to a negative electrode of the DC power supply 20 via the switching element 1a. The DC-DC converter 1 further includes: a diode 1c for preventing reverse flow, of which an anode is connected to one end of the secondary winding of the transformer 1b; and a smoothing capacitor 1d which is connected between a cathode of the diode 1c and the other end of the secondary winding. In the DC-DC converter 1, when the switching element 1a is in an on-state through the control circuit 4, a current flows through the primary winding and energy is stored in the transformer 1b. In the DC-DC converter 1, when the switching element 1a is changed into an off-state, a counter electromotive force is generated in a direction to continue to allow the current to flow through the transformer 1b. In the DC-DC converter 1, when the switching element 1a is changed into the off-state, the energy stored in the transformer 1b is supplied from the secondary winding to the smoothing capacitor 1d via the diode 1c. The DC-DC converter 1 superposes the counter electromotive force generated in the transformer 1b with a voltage due to charges charged in the smoothing capacitor 1d.

In the DC-DC converter 1, because the counter electromotive force generated in the transformer 1b depends on a magnitude of magnetic flux that is formed in the transformer 1b, the counter electromotive force tends to increase with an increase of the current flowing through the transformer 1b. Further, in the DC-DC converter 1, because the counter electromotive force increases with an increase of a time period during which the current flows through the transformer 1b, the DC voltage V2 tends to increase with an increase of an on-period of the switching element 1a. The DC-DC converter 1 is configured to change a magnitude of the DC voltage V2 by changing a duty ratio that is a ratio of the on-period to one cycle in the switching element 1a. The light-emitting-diode-driving device 10 according to the present embodiment is configured to apply, to the light source 21, the prescribed DC voltage V2 suitable to the light source 21, by the control circuit 4 performing PWM (Pulse Width Modulation) control through changing the duty ratio in the switching element 1a.

The DC-DC converter 1 is configured to perform any of a voltage step-up operation and a voltage step-down operation by adjusting an inductance ratio of the primary winding on the side of the DC power supply 20 and the secondary winding on the side of the light source 21 of the transformer 1b, or the duty ratio in the switching element 1a. When the DC voltage $V_{in}$ supplied from the DC power supply 20 (battery provided in a vehicle) is 12V for example, the light-emitting-diode-driving device 10 can step up the DC voltage $V_{in}$ to the prescribed DC voltage V2 corresponding to a drive voltage (e.g., 14V) of the light source 21 through the voltage step-up operation of the DC-DC converter 1. On the other hand, when the DC voltage $V_{in}$ supplied from the DC power supply 20 (battery provided in a vehicle) is 24V or 48V for example, the light-emitting-diode-driving device 10 can step down the DC voltage $V_{in}$ to the prescribed DC voltage V2 corresponding to the drive voltage (e.g., 14V) of the light source 21 through the voltage step-down operation of the DC-DC converter 1.

That is, the light-emitting-diode-driving device 10 according to the present embodiment can step-up or step-down, by periodically performing on/off switching of the switching element 1a, the DC voltage $V_{in}$ supplied from the DC power supply 20 to output the prescribed DC voltage V2 through the DC-DC converter 1. Further, the light-emitting-diode-driving device 10 can perform the constant current control for the light source 21, by controlling the on/off switching of the switching element 1a.

The light-emitting-diode-driving device 10 further includes the voltage detection unit 2 which is configured to detect a voltage across the light source 21. The voltage detection unit 2 includes a resistor part 2a that is provided in the DC-DC converter 1. The resistor part 2a is configured by, for example, two voltage dividing resistors (not shown) which are connected in series to each other and are connected in parallel to the smoothing capacitor 1d, of which both ends correspond to output terminals of the DC-DC converter 1. The voltage detection unit 2 may be configured to detect a dividing voltage that is obtained by the two voltage dividing resistors dividing the voltage across the light source 21, and output the dividing voltage to a side of the control circuit 4. Because the dividing voltage detected by the voltage detection unit 2 is proportional to the voltage across the light source 21, the light-emitting-diode-driving device 10 can detect the value $V_{out}$ of the voltage across the light source 21 by detecting the dividing voltage.

The light-emitting-diode-driving device 10 further includes the current detection unit 3 which is configured to detect a current that flows through the light source 21. The current detection unit 3 is configured by a resistor 3a which is inserted between the light source 21 and the smoothing capacitor 1d. One end of the resistor 3a is connected to the negative electrode side of the DC power supply 20. The current detection unit 3 is configured to output voltage drop that is generated between both ends of the resistor 3a, as a signal voltage corresponding to the value $I_{out}$ of the current flowing through the light source 21. The current detection unit 3 is configured to output the signal voltage to the control circuit 4. Because the signal voltage is proportional to the current flowing through the light source 21, the light-emitting-diode-driving device 10 can detect the value $I_{out}$ of the current flowing through the light source 21 by detecting the signal voltage.

The light-emitting-diode-driving device 10 further includes the control circuit 4 which is configured to perform the constant current control with the DC-DC converter 1. The control circuit 4 further includes a comparator part 44 which is configured to compare the value $I_{out}$ of the current detected by the current detection unit 3 with a prescribed reference current value to be supplied to the light source 21. Further, the control circuit 4 includes a drive-signal-instruction unit 45 and a drive-signal-generation unit 46. The drive-signal-instruction unit 45 is configured to instruct the drive-signal-generation unit 46 to generate a drive signal for adjusting the duty ratio in the switching element 1a, based on a comparison result in the comparator part 44. The drive-signal-generation unit 46 is configured to output, to the switching element 1a, the drive signal for the duty ratio corresponding to a signal output from the drive-signal-instruction unit 45. The drive-signal-generation unit 46 is connected to a gate electrode of the switching element 1a that is a power MOSFET. The control circuit 4 performs the constant current control with the DC-DC converter 1 by controlling the on/off operation of the switching element 1a with the drive signal output from the drive-signal-generation unit 46. In other words, the control circuit 4 includes the comparator part 44, drive-signal-instruction unit 45 and drive-signal-generation unit 46, in order to perform the constant current control with the DC-DC converter 1 so that the value $I_{out}$ of the current flowing through the light source 21 agrees with the prescribed reference current value to be supplied to the light source 21, based on the signal voltage output from the current detection unit 3.

The light-emitting-diode-driving device 10 according to the present embodiment further includes the comparator circuit 43 which is configured to compare, with the threshold voltage set by the threshold-voltage-setting unit 42, the value $V_{out}$ of the voltage across the light source 21 detected by the voltage detection unit 2. The comparator circuit 43 is configured to output, to a stop-signal-instruction unit 47, a result obtained by comparing, with the threshold voltage set by the threshold-voltage-setting unit 42 (configured to set a threshold for the voltage across the light source 21), the value $V_{out}$ of the voltage across the light source 21 detected by the voltage detection unit 2. The stop-signal-instruction unit 47 determines that the short circuit failure is present in the light source 21, if the value $V_{out}$ of the voltage detected by the voltage detection unit 2 is equal to or less than the threshold voltage in the result output from the comparator circuit 43. On the other hand, the stop-signal-instruction unit 47 determines that the short circuit failure is absent in the light source 21, if the value $V_{out}$ of the voltage detected by the voltage detection unit 2 is more than the threshold voltage in the result output from the comparator circuit 43. When determining that the short circuit failure is present in the light source 21, the stop-signal-instruction unit 47 outputs, to the drive-signal-instruction unit 45, a stop signal for stopping the operation of the DC-DC converter 1. In the light-emitting-diode-driving device 10, the drive-signal-instruction unit 45 outputs, to the drive-signal-generation unit 46, an instruction of stopping the DC-DC converter 1 in response to the reception of the stop signal.

Further, the light-emitting-diode-driving device 10 preferably includes a power-supply-monitoring unit 48 which is configured to monitor fluctuation of the DC voltage $V_{in}$ supplied from the DC power supply 20. The power-supply-monitoring unit 48 is electrically connected to the reference-current-instruction unit 41. The power-supply-monitoring unit 48 outputs, to the reference-current-instruction unit 41, a signal for reducing the reference current value, when the DC voltage $V_{in}$ supplied from the DC power supply 20 is less than a prescribed input voltage. The reference-current-instruction unit 41 reduces the reference current value when receiving the signal from the power-supply-monitoring unit 48, and then outputs the reduced reference current value to the comparator part 44. The comparator part 44 compares, with the reference current value, the value $I_{out}$ of the current detected by the current detection unit 3, and outputs the comparison result to the drive-signal-instruction unit 45. The drive-signal-instruction unit 45 instructs the drive-signal-generation unit 46 to generate a drive signal for reducing a difference between the reference current value and the value $I_{out}$ of the current detected by the current detection unit 3. That is, the light-emitting-diode-driving device 10 according to the present embodiment makes the comparator part 44 compare the prescribed reference current value set by the reference-current-instruction unit 41, with the value $I_{out}$ of the current detected by the current detection unit 3, and changes the duty ratio in the drive signal so that the difference obtained by the comparison is reduced to perform the constant current control of keeping constant an output current I2 to be supplied to the light source 21. The light-emitting-diode-driving device 10 preferably includes an error amplifier (not shown) for amplifying the difference between the detected value $I_{out}$ of the current and the reference current value, in order to improve accuracy of the constant current control.

When the power-supply-monitoring unit 48 (monitoring the DC voltage $V_{in}$ supplied from the DC power supply 20) detects reduction in the DC voltage $V_{in}$, it is possible to protect the light-emitting-diode-driving device 10 by reducing the prescribed reference current value set by the reference-current-instruction unit 41. The light-emitting-diode-driving device 10 can control variably the threshold voltage for the DC voltage V2 according to the prescribed reference current value set by the reference-current-instruction unit 41.

For the control circuit 4, for example a microcomputer may be used. In this case, the microcomputer may execute appropriate programs, thereby achieving functions of the reference-current-instruction unit 41, threshold-voltage-setting unit 42, comparator circuit 43, comparator part 44, drive-signal-instruction unit 45, drive-signal-generation unit 46, stop-signal-instruction unit 47 and power-supply-monitoring unit 48. The programs may be stored in a storage device (not shown) that is provided with the microcomputer. The control circuit 4 can receive the voltage detected by the voltage detection unit 2, through an A/D conversion circuit (not shown) of the microcomputer that constitutes the control circuit 4. Similarly, the control circuit 4 can receive the current detected by the current detection unit 3, through the A/D conversion circuit of the microcomputer that constitutes the control circuit 4.

The light-emitting-diode-driving device 10 according to the present embodiment can perform, by the PWM control, the constant current control so that the value $I_{out}$ of the current flowing through the light source 21 agrees with the prescribed reference current value, and accordingly, it is possible to more improve accuracy of determination of a short circuit that occurs in the light source 21.

Figure 2:
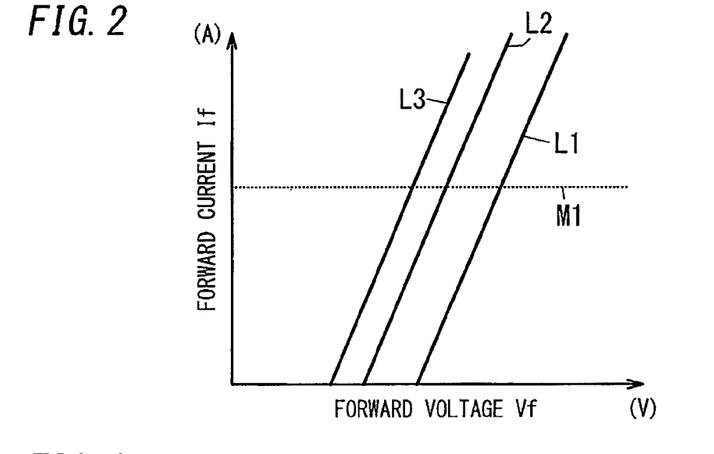
FIG. 2 is a graph illustrating a relationship of two forward current-forward voltage characteristics in two light sources and a threshold voltage, in the light-emitting-diode-driving device according to the First Embodiment.
Figure 3:
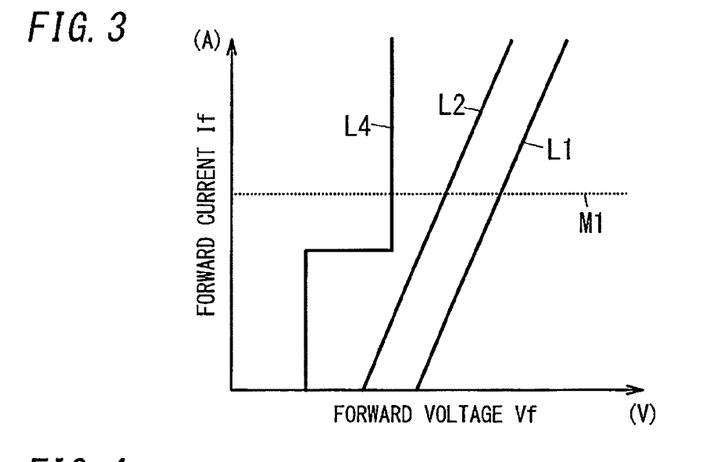
FIG. 3 is a graph illustrating a relationship of the two forward current-forward voltage characteristics in the two light sources and another threshold voltage, in the light-emitting-diode-driving device according to the First Embodiment.
Figure 4:
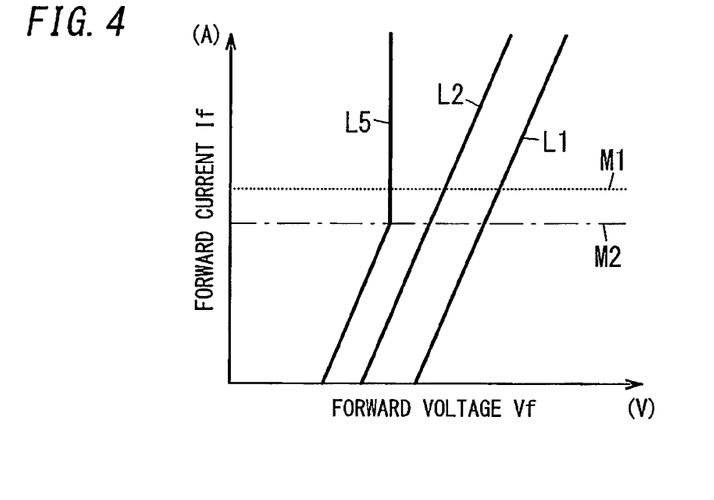
FIG. 4 is a graph illustrating a relationship of the two forward current-forward voltage characteristics in the two light sources and yet another threshold voltage, in the light-emitting-diode-driving device according to the First Embodiment.

The light-emitting-diode-driving device 10 according to the present embodiment is described below, with reference to FIGS. 2 to 4. Further, a comparison example is described, with reference to FIGS. 7 and 8, for comparison with the light-emitting-diode-driving device 10 according to the present embodiment. In FIGS. 2 to 4, 7 and 8, the same reference signs denote the same meaning.

The comparison example is first described.

Figure 7:
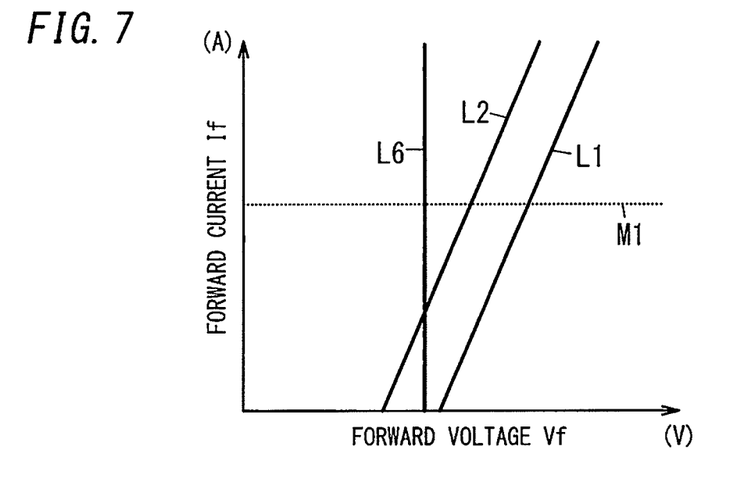
FIG. 7 is a graph illustrating a relationship of two forward current-forward voltage characteristics in two light sources and a threshold voltage, in a comparison example for comparison with the light-emitting-diode-driving device according to the First Embodiment.

FIG. 7 shows, in the comparison example, two forward current-forward voltage characteristics, each of which denotes a relationship between a forward current If flowing through the light source 21 and a forward voltage Vf across the light source 21, where the two forward current-forward voltage characteristics are conveniently shown with a straight line L1 and a straight line L2. Here, the straight lines L1 and L2 respectively show the two forward current-forward voltage characteristics relating to different two light sources 21 (that is, the straight line L1 denotes a forward current-forward voltage characteristic obtained when the comparison example is connected to one of the two light sources 21, and the straight line L2 denotes a forward current-forward voltage characteristic obtained when the comparison example is connected to the other). A difference between the straight lines L1 and L2 is caused by unavoidable dispersion that is generated in the manufacturing process of the light emitting diodes 21a, each of which is a semiconductor light emitting element. That is, there is a case where the dispersion occurs in the forward current-forward voltage characteristics of the light sources 21 including the light emitting diodes 21a due to the dispersion upon the manufacture of the semiconductor light emitting elements. In particular, the dispersion tends to increase in the case of the light source 21 that is configured by electrically connecting the plural light emitting diodes 21a in series. The straight line L2 denotes to a forward current-forward voltage characteristic of a light source 21 that corresponds to a lower limit of the dispersion of the forward voltages Vf across the light sources 21. In each of FIGS. 2 to 4, 7 and 8, a broken line M1 denotes a rated current in the light source 21 including the plural light emitting diodes 21a.

Here, the comparison example is configured to set a threshold voltage that is kept constant, for determining a short circuit failure in the light source 21. For example, the comparison example is configured to compare the value $V_{out}$ of the voltage detected by the voltage detection unit 2 with the threshold voltage that is fixed at a prescribed voltage value and denoted by a straight line L6, and determine that the short circuit failure is present in the light source 21 if the value $V_{out}$ of the voltage is less than the threshold voltage.

As shown in FIG. 7, the comparison example compares the threshold voltage denoted by the straight line L6 with the value $V_{out}$ of the voltage across each of the light sources 21, detected by the voltage detection unit 2, shown as the forward current-forward voltage characteristics of the straight lines L1 and L2, and accordingly, it is possible to detect the short circuit failure in each of the light sources 21.

When the DC voltage $V_{in}$ supplied from the DC power supply 20 is reduced due to deterioration of the DC power supply 20 or the like, there is a case where the comparison example reduces the output current I2 to a prescribed reference current value that is slightly less than the rated current, in order to avoid failure of the device. In this case, the forward voltage Vf is reduced according to the forward current-forward voltage characteristic of the light source 21 with the reduction to the prescribed reference current value in the comparison example. Therefore, when the comparison example is connected to the light source 21 showing the forward current-forward voltage characteristic of the straight line L2 shown in FIG. 7, there is fear that, depending on setting of the threshold voltage, the comparison example incorrectly determines that the short circuit failure is present despite the fact that the forward voltage Vf becomes less than the threshold voltage with the reduction of the output current I2 and the short circuit failure is absent in the light source 21.

Figure 8:
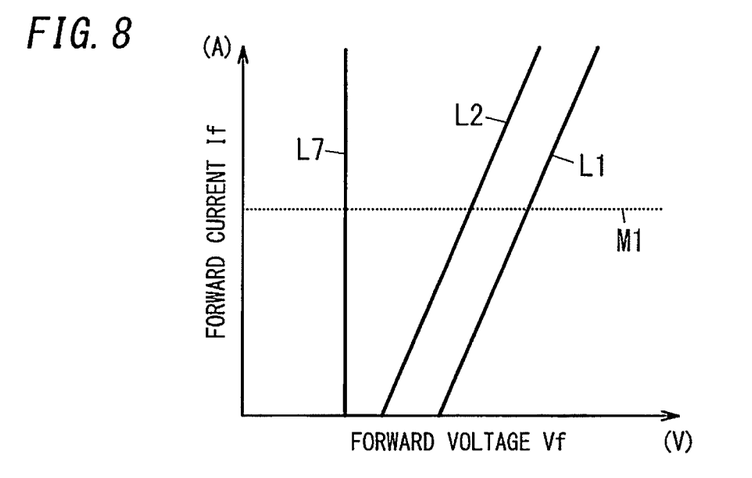
FIG. 8 is a graph illustrating a relationship of the two forward current-forward voltage characteristics in the two light sources and another threshold voltage, in the comparison example for the comparison with the light-emitting-diode-driving device according to the First Embodiment.

Also, in the comparison example, a case can be considered where the threshold voltage is set as a straight line L7 shown in FIG. 8, for detecting a short circuit failure in the light source 21 or a short circuit failure that occurs in a part of the plural light emitting diodes 21a in the light source 21, when allowing the rated current to flow. In the comparison example, a lower limit value of the forward voltage Vf (in each of the forward current-forward voltage characteristics of the straight lines L1 and L2) in the case of the threshold voltage as the straight line L7 shown in FIG. 8 is lower than that in the case of the threshold voltage as the straight line L6 shown in FIG. 7.

In order to prevent from incorrectly determining that the short circuit failure is present in the light source 21 even when reducing the output current I2, the comparison example is required to set the threshold voltage for determining the short circuit failure at a position that is lower than the forward voltage Vf when reducing the output current I2, as the straight line L7 in FIG. 8. However, in the comparison example shown in FIG. 8, there is fear that the accuracy is deteriorated in regard to detection of the short circuit failure that occurs in a part of the plural light emitting diodes 21a in the light source 21 when allowing the rated current to flow.

Here, the forward current If means a current that flows while the plural light emitting diodes 21a in the light source 21 emit light. The forward voltage Vf means a voltage that is applied across the light source 21 when a forward current is made to flow through the light source 21 including the plural light emitting diodes 21a. Further, the rated current means the maximum value of a current that is previously designed and capable of being made flow through the light source 21. Generally, a design value at which a light emitting diode 21a is capable of emitting light without being destroyed is specified as a rated value. In the light source 21, the reference current value may be set based on a rated current of each light emitting diode 21a.

In the light-emitting-diode-driving device 10 according to the present embodiment, a threshold voltage is set along a direction parallel with a gradient of a forward current-forward voltage characteristic in the light source 21, as a straight line L3 in FIG. 2, in order to improve the misdetection or the reduction of the detection accuracy of the short circuit failure in the light source 21 by the comparison example.

In the light-emitting-diode-driving device 10, the threshold-voltage-setting unit 42 sets the threshold voltage as the straight line L3, and accordingly, even when the prescribed reference current value set by the reference-current-instruction unit 41 is changed, it is possible to detect accurately the short circuit in the light source 21. Therefore, the light-emitting-diode-driving device 10 according to the present embodiment can suppress the misdetection or the reduction of the detection accuracy of the short circuit failure in the light source 21.

The light-emitting-diode-driving device 10 according to the present embodiment is not limited to the configuration of setting the threshold voltage, linearly as shown in FIG. 2, along the direction parallel with the gradient of the forward current-forward voltage characteristic, in regard to a relationship between the forward voltage Vf across the light source 21 and the output current I2. In the light-emitting-diode-driving device 10 according to the present embodiment, the control circuit 4 may be configured to change, in stages, the threshold voltage along the direction parallel with the gradient of the forward current-forward voltage characteristic in the light source 21, as a polygonal line L4 in FIG. 3. The threshold voltage denoted by the polygonal line L4 may be set, in stages, according to a rated forward current of each of the plural light emitting diodes 21a constituting the light source 21, and the number of the plural light emitting diodes 21a connected in series. The threshold voltage is conveniently shown with a polygonal line in which a straight line is bent. However, the threshold voltage may be shown with a line that includes a curved portion partly. The light-emitting-diode-driving device 10 in FIG. 3 is configured to change, in two stages, the threshold voltage. However, the light-emitting-diode-driving device 10 may be configured to change, in "n" stages (n: positive natural number), the threshold voltage. It is possible to more simplify the configuration of the control circuit 4 by the light-emitting-diode-driving device 10 being configured to change, in stages, the threshold voltage.

The light-emitting-diode-driving device 10 according to the present embodiment may be configured to change a characteristic, depending on a case where the output current I2 is near the rated current of the light source 21 or a case where the output current I2 is more than the rated current, based on the relationship of the forward current-forward voltage characteristic in the light source 21. Because the light-emitting-diode-driving device 10 is generally configured not to allow a current that is the rated current or more to flow through the light source 21, the threshold voltage is fixed in regard to a range of the output current I2 that is more than the rated current. Further, as the threshold voltage denoted by a polygonal line L5 in FIG. 4, the light-emitting-diode-driving device 10 may be configured to set the threshold voltage to a fixed value when the output current I2 is near the rated current or more than the rated current, and switch the setting so as to reduce the threshold voltage in a range where the forward voltage Vf is reduced with reduction of the output current I2. The light-emitting-diode-driving device 10 sets the prescribed reference current value set by the reference-current-instruction unit 41 to be parallel with the forward current-forward voltage characteristic in the light source 21, in the case where the output current I2 is near the rated current of the light source 21 as shown in FIG. 4. The light-emitting-diode-driving device 10 may be configured to set the threshold voltage to a fixed value, in the case where the output current I2 is more than the rated current of the light source 21.

That is, the control circuit 4 is configured to set, when a current to be output to the light source 21 is less than a specific value (see a dashed line M2 in FIG. 4), the threshold voltage along the direction parallel with the gradient of the forward current-forward voltage characteristic in the light source 21. Further, the control circuit 4 is configured to set, when the current to be output to the light source 21 is equal to or more than the specific value, the threshold voltage to a fixed value. By the light-emitting-diode-driving device 10 according to the present embodiment being configured to set the threshold voltage as the polygonal line L5, it is possible to detect accurately the short circuit in the light source 21 regardless of a change in the prescribed reference current value set by the reference-current-instruction unit 41 when the prescribed reference current value is the rated current or less. Therefore, the light-emitting-diode-driving device 10 according to the present embodiment can more suppress the misdetection of the short circuit in the light source 21.

Figure 5:
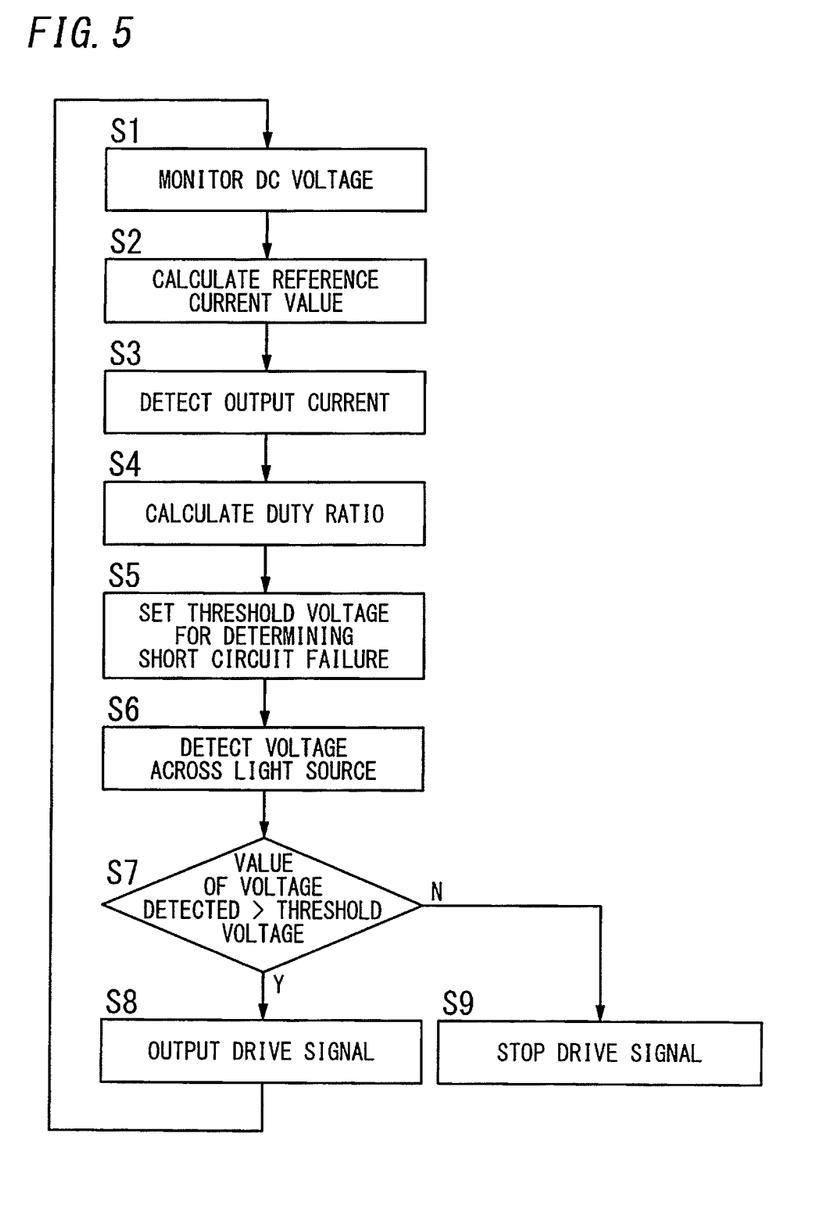
FIG. 5 is a flowchart illustrating an operation of the light-emitting-diode-driving device according to the First Embodiment.

The light-emitting-diode-driving device 10 according to the present embodiment may perform an operation as a flowchart in FIG. 5.

In the light-emitting-diode-driving device 10, the control circuit 4 monitors, with the power-supply-monitoring unit 48, whether or not the DC voltage $V_{in}$ supplied from the DC power supply 20 is within a prescribed drive voltage range that has been previously set (Step S1).

Figure 6:
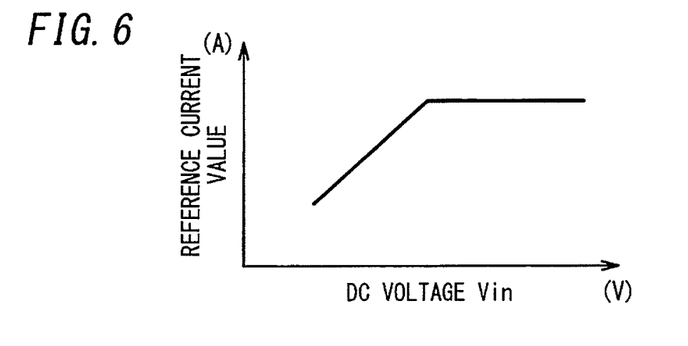
FIG. 6 is a graph illustrating an operation of a main part of the light-emitting-diode-driving device according to the First Embodiment.

When the power-supply-monitoring unit 48 detects that the DC voltage $V_{in}$ supplied from the DC power supply 20 is lower than the prescribed drive voltage range due to deterioration, failure, end of service life, or the like of the DC power supply 20, the reference-current-instruction unit 41 reduces the reference current value to stop driving of the light-emitting-diode-driving device 10. When the control circuit 4 detects reduction of the DC voltage $V_{in}$ supplied from the DC power supply 20 due to deterioration or the like of the DC power supply 20 through a signal output from the power-supply-monitoring unit 48 as shown in FIG. 6, the reference-current-instruction unit 41 calculates and outputs a new reference current value which is lower than the reference current value that has been previously set (Step S2). On the other hand, when the control circuit 4 detects that the DC voltage $V_{in}$ supplied from the DC power supply 20 is within the prescribed drive voltage range through the signal output from the power-supply-monitoring unit 48, the reference-current-instruction unit 41 outputs the reference current value that has been previously set to drive the DC-DC converter 1.

Then, in the light-emitting-diode-driving device 10, the control circuit 4 operates the DC-DC converter 1 to convert, into the prescribed DC voltage V2, the DC voltage $V_{in}$ supplied from the DC power supply 20, and allows the output current I2 to flow through the light source 21 so as to agree with the reference current value. The light-emitting-diode-driving device 10 detects the output current I2 (Step S3). In the light-emitting-diode-driving device 10, the control circuit 4 calculates the duty ratio in the drive signal for performing the switching of the switching element 1a with the PWM control so that the current value detected by the current detection unit 3 agrees with the reference current value previously set (Step S4). The light-emitting-diode-driving device 10 controls the DC voltage V2 of the DC-DC converter 1 based on the drive signal including the calculated duty ratio. The light-emitting-diode-driving device 10 sets the threshold voltage for determining the short circuit failure in the light source 21, based on the reference current value (Step S5). In the light-emitting-diode-driving device 10, the voltage detection unit 2 detects a voltage across the light source 21 (Step S6).

Then, in the light-emitting-diode-driving device 10, the comparator circuit 43 compares the value $V_{out}$ of the voltage detected by the voltage detection unit 2 with the threshold voltage (Step S7). When the value $V_{out}$ of the voltage is more than the threshold voltage, the light-emitting-diode-driving device 10 continues outputting of the drive signal for operating the DC-DC converter 1 (Step S8). When the value $V_{out}$ of the voltage is equal to or less than the threshold voltage, the light-emitting-diode-driving device 10 stops outputting of the drive signal to stop the operation of the DC-DC converter 1 (Step S9).

Each component included in the light-emitting-diode-driving device 10 according to the present embodiment is detailed below, using FIG. 1 again.

The DC-DC converter 1 is configured to convert, into the prescribed DC voltage V2, the DC voltage $V_{in}$ supplied from the DC power supply 20, and apply the DC voltage V2 to the light source 21 including the plural light emitting diodes 21a. The DC-DC converter 1 may be configured by a flyback converter for example. However, the DC-DC converter 1 is not limited to the flyback converter. The DC-DC converter 1 may be configured by a forward converter, a choke converter, a half-bridge converter, or a full-bridge converter.

The voltage detection unit 2 is configured to detect the voltage across the light source 21. The voltage detection unit 2 is configured by, for example, two voltage dividing resistors which are connected in series to each other and are connected in parallel to the DC-DC converter 1. Because the dividing voltage detected by the voltage detection unit 2 is proportional to the voltage across the light source 21, the light-emitting-diode-driving device 10 can detect the value $V_{out}$ of the voltage across the light source 21 by detecting the dividing voltage.

The current detection unit 3 is configured to detect the current that flows through the light source 21. The current detection unit 3 is configured by, for example, the resistor 3a provided in the DC-DC converter 1. The current detection unit 3 is configured to output the voltage drop that is generated between both ends of the resistor 3a, as the signal voltage corresponding to the detection value of the output current I2. Because the signal voltage is proportional to the current flowing through the light source 21, the light-emitting-diode-driving device 10 can detect the current flowing through the light source 21 by detecting the signal voltage.

The control circuit 4 is configured to perform the constant current control with the DC-DC converter 1 so that the value of the current detected by the current detection unit 3 agrees with the prescribed reference current value to be supplied to the light source 21. The control circuit 4 is configured by, for example, a microcomputer that executes appropriate programs. The reference-current-instruction unit 41 of the control circuit 4 is configured to set the prescribed reference current value to be supplied to the light source 21, and the microcomputer may execute a prescribed program, thereby achieving the function. The threshold-voltage-setting unit 42 of the control circuit 4 is configured to set the threshold voltage for determining the short circuit failure in the light source 21, and the microcomputer may execute a prescribed program, thereby achieving the function. The comparator circuit 43 of the control circuit 4 is configured to compare, with the threshold voltage set by the threshold-voltage-setting unit 42, the value $V_{out}$ of the voltage across the light source 21 that is detected by the voltage detection unit 2, and the microcomputer may execute a prescribed program, thereby achieving the function. When the reference-current-instruction unit 41 reduces the prescribed reference current value, the control circuit 4 may be configured to reduce the threshold voltage set by the threshold-voltage-setting unit 42. The microcomputer may be configured to be connected to the storage device that stores the appropriate programs and the threshold voltage.

Second Embodiment

Figure 9:
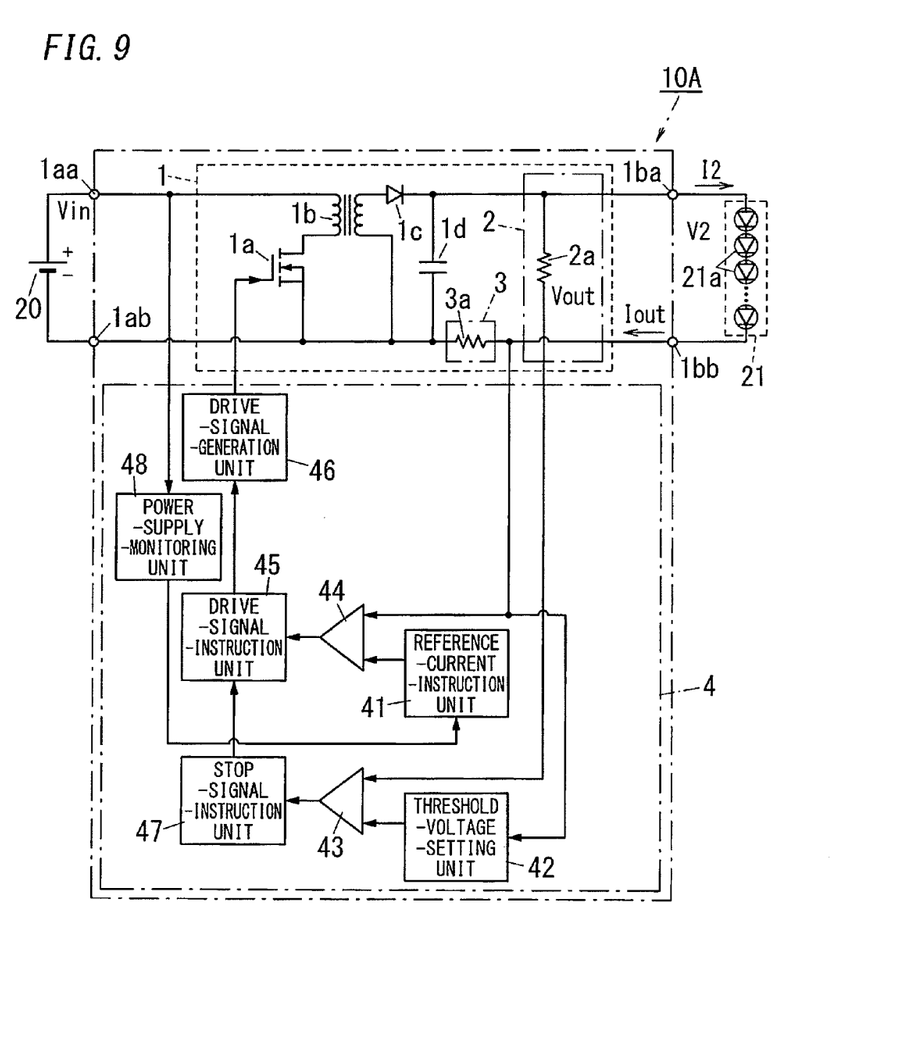
FIG. 9 is a drawing illustrating a circuit configuration of a light-emitting-diode-driving device according to Second Embodiment.

A light-emitting-diode-driving device 10A according to the present embodiment in FIG. 9 is different from the light-emitting-diode-driving device 10 according to the First Embodiment in FIG. 1 in that the light-emitting-diode-driving device 10A is configured to control a threshold voltage set by a threshold-voltage-setting unit 42 in response to a detection value of an output current I2 instead of a reference-current-instruction unit 41 being configured to directly control the threshold voltage set by the threshold-voltage-setting unit 42. Regarding the light-emitting-diode-driving device 10A according to the present embodiment, components similar to those of the First Embodiment are assigned with same reference signs and the explanation thereof is properly omitted.

As shown in FIG. 9, in the light-emitting-diode-driving device 10A according to the present embodiment, a control circuit 4 is configured to make the threshold-voltage-setting unit 42 reduce the threshold voltage, when detecting, with a current detection unit 3, that a value $I_{out}$ of a current flowing through a light source 21 is reduced below a prescribed reference current value.

In the light-emitting-diode-driving device 10A according to the present embodiment, the light source 21 is controlled with the constant current control. Therefore, when the light-emitting-diode-driving device 10A controls to reduce the prescribed reference current value set by the reference-current-instruction unit 41, a duty ratio in a DC-DC converter 1 is reduced, and accordingly the value $I_{out}$ of the current detected by the current detection unit 3 is also reduced.

Therefore, the light-emitting-diode-driving device 10A according to the present embodiment can detect more accurately a short circuit that occurs in the light source 21 including plural light emitting diodes 21a. In addition, it is possible to detect more accurately the short circuit failure in the light source 21 by the light-emitting-diode-driving device 10A according to the present embodiment being configured to control the threshold voltage in response to the value $I_{out}$ of the current detected by the current detection unit 3, as shown in FIGS. 2 to 4, similarly to the First Embodiment.

Third Embodiment

Figure 10:
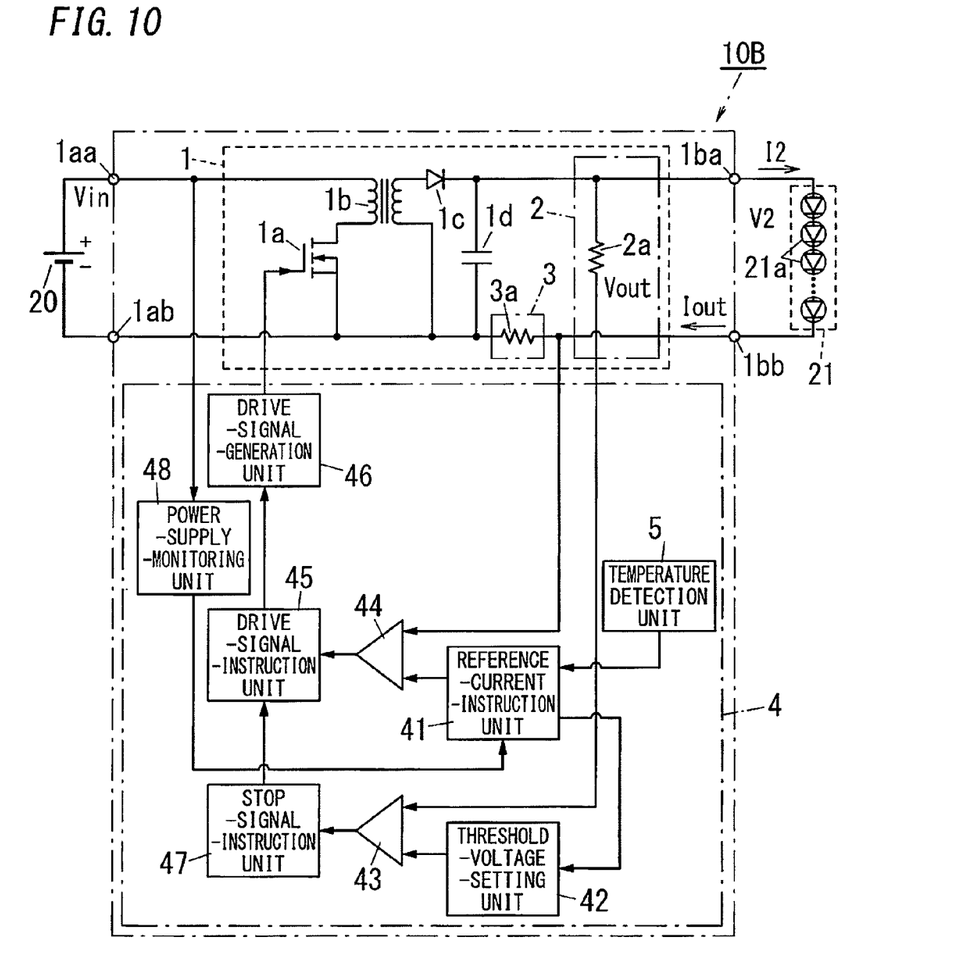
FIG. 10 is a drawing illustrating a circuit configuration of a light-emitting-diode-driving device according to Third Embodiment.

A light-emitting-diode-driving device 10B according to the present embodiment in FIG. 10 is different from the light-emitting-diode-driving device 10 according to the First Embodiment in FIG. 1 mainly in that a control circuit 4 is electrically connected to a temperature detection unit 5. Regarding the light-emitting-diode-driving device 10B according to the present embodiment, components similar to those of the First Embodiment are assigned with same reference signs and the explanation thereof is properly omitted.

As shown in FIG. 10, in the light-emitting-diode-driving device 10B according to the present embodiment, the control circuit 4 is electrically connected to the temperature detection unit 5 that is configured to detect a temperature Ta of a light source 21. The control circuit 4 is configured to perform, when the temperature Ta detected by the temperature detection unit 5 is more than a predetermined temperature, the constant current control with a DC-DC converter 1 so as to reduce a current to be output to the light source 21.

Figure 11:
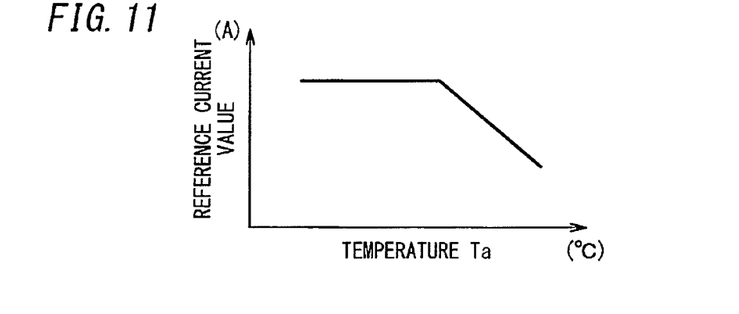
FIG. 11 is a graph illustrating an operation of a main part of the light-emitting-diode-driving device according to the Third Embodiment.

The light source 21 including plural light emitting diodes 21a, generally, has a temperature characteristic that a resistance of the light source 21 is reduced with an increase in the temperature of the light source 21 and accordingly a current easily flows through the light source 21 (see FIG. 11). The light-emitting-diode-driving device 10B is configured to drive the DC-DC converter 1 so as to reduce fluctuation of a forward current-forward voltage characteristic of the light source 21, depending on the temperature change, based on the temperature Ta of the light source 21 detected by the temperature detection unit 5. Therefore, even if the temperature Ta of the light source 21 is changed, the light-emitting-diode-driving device 10B can keep substantially constant an output current I2 of the DC-DC converter 1. Further, the light-emitting-diode-driving device 10B according to the present embodiment can suppress damage of the light source 21 or the device itself that is caused by an excessive increase in the temperature Ta of the light source 21. Further, even when the light-emitting-diode-driving device 10B according to the present embodiment reduces the output current I2 to be less than the rated current according to the increase in the temperature Ta of the light source 21, it is possible to detect more accurately the short circuit failure in the light source 21 including the plural light emitting diodes 21a.

Figure 12:
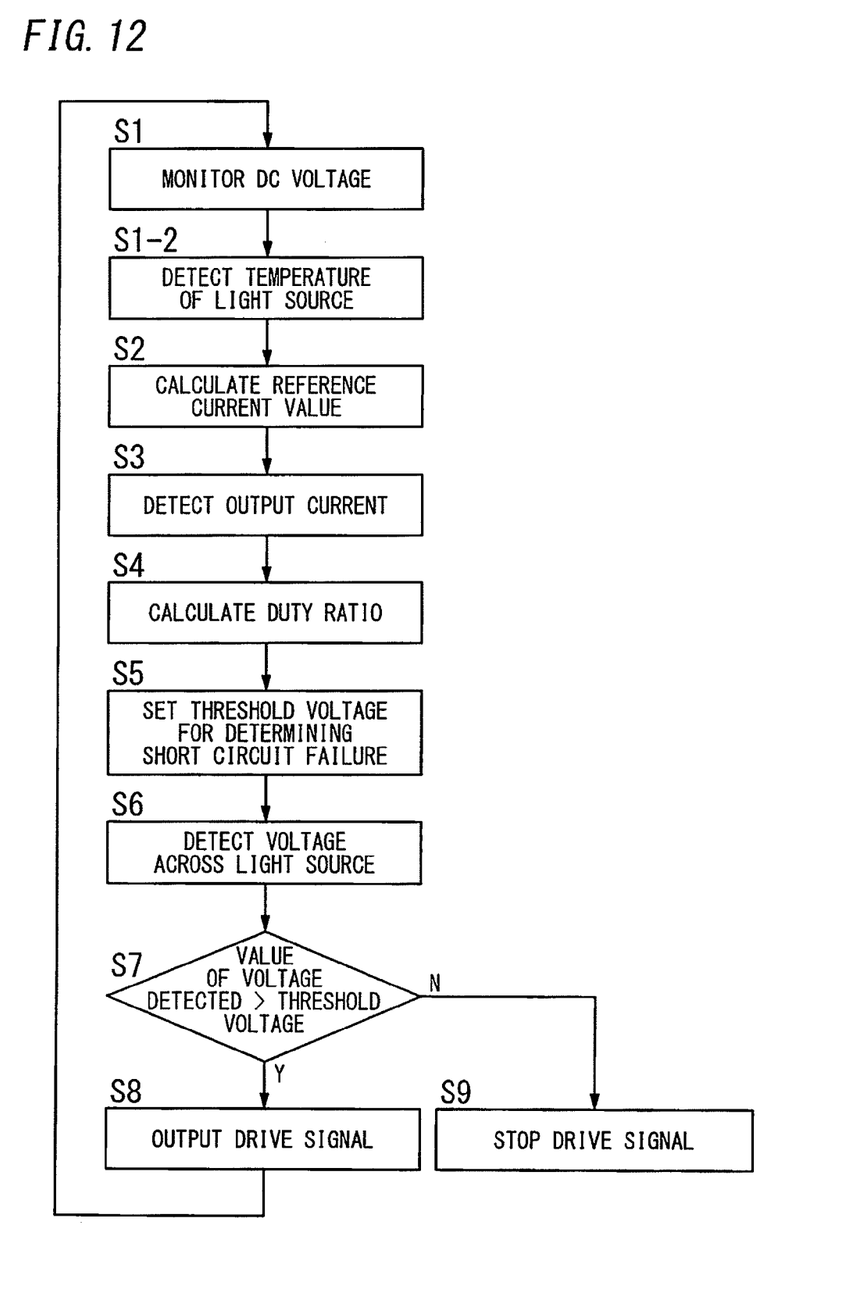
FIG. 12 is a flowchart illustrating an operation of the light-emitting-diode-driving device according to the Third Embodiment.

The light-emitting-diode-driving device 10B according to the present embodiment is configured to perform a process of detecting the temperature Ta of the light source 21, in addition to the operation process in the First Embodiment shown in FIG. 5. In the light-emitting-diode-driving device 10B according to the present embodiment, as a flowchart in FIG. 12, the process of detecting the temperature Ta of the light source 21 (Step S1-2) may be provided before the process of calculating the reference current value (Step S2).

As shown in FIG. 10, in the present embodiment, the temperature detection unit 5 is provided in the light-emitting-diode-driving device 10B. However, it is not limited to the configuration of the temperature detection unit 5 being provided in the light-emitting-diode-driving device 10B. In the present embodiment, the temperature detection unit 5 may be provided near the light source 21 that is located outside the light-emitting-diode-driving device 10B. In this case, the light-emitting-diode-driving device 10B can detect more accurately the temperature Ta of the light source 21. The temperature detection unit 5 may be configured by a thermo-sensitive element such as a thermistor. The temperature detection unit 5 is configured to allow a current to flow through the thermo-sensitive element and measure a voltage across the thermo-sensitive element, and thereby, it is possible to detect the temperature Ta of the light source 21.

It is possible to detect more accurately the short circuit failure in the light source 21 by the light-emitting-diode-driving device 10B according to the present embodiment being configured to control the threshold voltage in response to the value $I_{out}$ of the current detected by the current detection unit 3, as shown in FIGS. 2 to 4, similarly to the First Embodiment. Although described the light-emitting-diode-driving device 10B according to the present embodiment based on the configuration similar to the First Embodiment, the temperature detection unit 5 may be applied to the configuration of the Second Embodiment. In any case, the light-emitting-diode-driving device 10B according to the present embodiment can detect more accurately the short circuit failure in the light source 21 including the plural light emitting diodes 21a.

Figure 13:
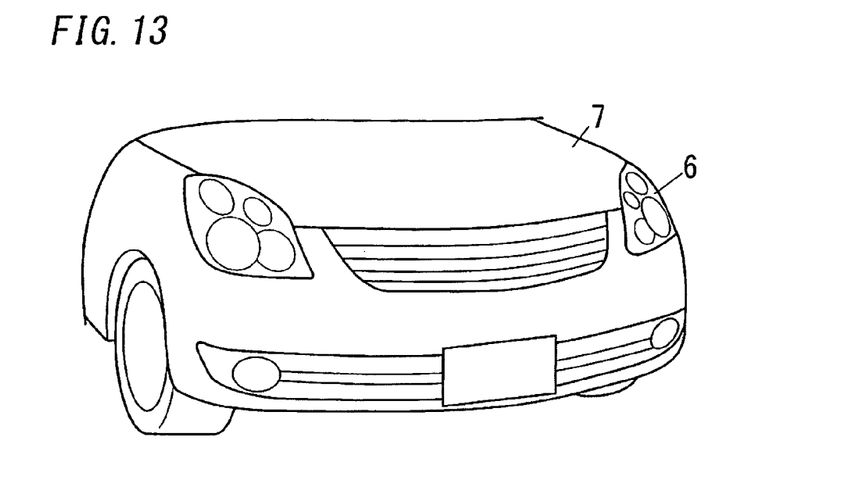
FIG. 13 is a schematic drawing illustrating a lighting apparatus for vehicle and a vehicle according to the Third Embodiment.

In the present embodiment, a lighting apparatus may include the plural light emitting diodes 21a and the light-emitting-diode-driving device 10B configured to turn on the plural light emitting diodes 21a as the light source 21. Needless to say, instead of the light-emitting-diode-driving device 10B, the light-emitting-diode-driving device 10 according to the First Embodiment or the light-emitting-diode-driving device 10A according to the Second Embodiment may be used in the lighting apparatus. The lighting apparatus may be a lighting apparatus 6 for vehicle, as shown in FIG. 13. Further, in the present embodiment, a vehicle may include the plural light emitting diodes 21a, the light-emitting-diode-driving device 10B (or 10 or 10A) configured to turn on the plural light emitting diodes 21a as the light source 21, and a vehicle body 7 in which the plural light emitting diodes 21a and the light-emitting-diode-driving device 10B (or 10 or 10A) are provided, as shown in FIG. 13. In this case, the lighting apparatus 6 for vehicle may be a headlight device for vehicle in which the light source 21 including the plural light emitting diodes 21a is provided on the front side of the vehicle body 7, for example.

According to the First to Third Embodiments described above, a light-emitting-diode-driving device 10 (or 10A or 10B) includes a DC-DC converter 1, a current detection unit 3 and a control circuit 4. The DC-DC converter 1 is configured to convert, into a prescribed DC voltage V2, a DC voltage $V_{in}$ that is supplied from a DC power supply 20, and apply the prescribed DC voltage V2 to a light source 21 including a light emitting diode 21a. The current detection unit 3 is configured to detect a current that flows through the light source 21. The control circuit 4 is configured to perform constant current control with the DC-DC converter 1 so that a value $I_{out}$ of the current detected by the current detection unit 3 agrees with a prescribed reference current value to be supplied to the light source 21. The control circuit 4 includes a reference-current-instruction unit 41, a threshold-voltage-setting unit 42 and a comparator circuit 43. The reference-current-instruction unit 41 is configured to set the prescribed reference current value to be supplied to the light source 21. The threshold-voltage-setting unit 42 is configured to set a threshold voltage for determining a short circuit failure in the light source 21. The comparator circuit 43 is configured to compare, with the threshold voltage, a value $V_{out}$ of a voltage across the light source 21 that is detected by a voltage detection unit 2. The control circuit 4 is configured to make the threshold-voltage-setting unit 42 reduce the threshold voltage, when the reference-current-instruction unit 41 reduces the prescribed reference current value.

According to the light-emitting-diode-driving device 10 (or 10A or 10B), it is possible to detect more accurately the short circuit failure in the light source 21 including the light emitting diode 21a.

In the light-emitting-diode-driving device 10A, preferably, the control circuit 4 is configured to make the threshold-voltage-setting unit 42 reduce the threshold voltage, when detecting that the value $I_{out}$ of the current detected by the current detection unit 3 is reduced below the prescribed reference current value.

In the light-emitting-diode-driving device 10 (or 10A or 10B), preferably, the threshold-voltage-setting unit 42 is configured to set the threshold voltage along a direction parallel with a gradient of a forward current-forward voltage characteristic in the light source 21.

In the light-emitting-diode-driving device 10 (or 10A or 10B), preferably, the control circuit 4 is configured to change, in stages, the threshold voltage along the direction parallel with the gradient of the forward current-forward voltage characteristic in the light source 21.

In the light-emitting-diode-driving device 10 (or 10A or 10B), preferably, the control circuit 4 is configured to set, when a current to be output to the light source 21 is less than a specific value, the threshold voltage along the direction parallel with the gradient of the forward current-forward voltage characteristic in the light source 21. In addition, preferably, the control circuit 4 is configured to set, when the current to be output to the light source 21 is equal to or more than the specific value, the threshold voltage to a fixed value.

In the light-emitting-diode-driving device 10B, preferably, the control circuit 4 is designed to be electrically connected to a temperature detection unit 5 that is configured to detect a temperature Ta of the light source 21. In this case, preferably, the control circuit 4 is configured to perform, when the temperature Ta detected by the temperature detection unit 5 is more than a predetermined temperature, the constant current control with the DC-DC converter 1 so as to reduce a current to be output to the light source 21.

A lighting apparatus 6 for vehicle includes: a light emitting diode 21a; and the light-emitting-diode-driving device 10 (or 10A or 10B) that is configured to turn on the light emitting diode 21a as the light source 21.

According to the lighting apparatus 6 for vehicle, it is possible to detect more accurately the short circuit failure in the light emitting diode 21a included as the light source 21 of the lighting apparatus 6.

A vehicle includes: a light emitting diode 21a; the light-emitting-diode-driving device 10 (or 10A or 10B) that is configured to turn on the light emitting diode 21a as the light source 21; and a vehicle body 7 in which the light emitting diode 21a and the light-emitting-diode-driving device 10 (or 10A or 10B) are provided.

According to the vehicle, it is possible to detect more accurately the short circuit failure in the light emitting diode 21a included as the light source 21 of the vehicle.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A light-emitting-diode-driving device, comprising:
a DC-DC converter configured to convert, into a prescribed DC voltage, a DC voltage that is supplied from a DC power supply, and apply the prescribed DC voltage to a light source including a light emitting diode;
a current detection unit configured to detect a current that flows through the light source; and
a control circuit configured to perform constant current control with the DC-DC converter so that a value of the current detected by the current detection unit agrees with a prescribed reference current value to be supplied to the light source, the control circuit comprising:
a reference-current-instruction unit configured to set the prescribed reference current value to be supplied to the light source;
a threshold-voltage-setting unit configured to set a threshold voltage for determining a short circuit failure in the light source;
a comparator circuit configured to compare, with the threshold voltage, a value of a voltage across the light source that is detected by a voltage detection unit; and
a power-supply-monitoring unit configured to output, to the reference-current-instruction unit, a signal for reducing the reference current value, when the DC voltage supplied from the DC power supply is less than a prescribed input voltage,
wherein the threshold-voltage-setting unit is configured to set the threshold voltage to be a lower voltage at a same current along a direction parallel with a slope of graph of a forward current-forward voltage characteristic in the light source,
the control circuit is being configured to make the threshold-voltage-setting unit reduce the threshold voltage, when the reference-current-instruction unit reduces the prescribed reference current value, and
the control circuit is configured to change, stepwise, the threshold voltage to be a lower voltage at a same current along the direction parallel with the slope of graph of the forward current-forward voltage characteristic in the light source.

2. The light-emitting-diode-driving device according to claim 1,
wherein the control circuit is configured to make the threshold-voltage-setting unit reduce the threshold voltage, when detecting that the value of the current detected by the current detection unit is reduced below the prescribed reference current value.

3. The light-emitting-diode-driving device according to claim 1,
wherein the control circuit is configured to set, when a current to be output to the light source is less than a specific value, the threshold voltage to be a lower voltage at a same current along the direction parallel with the slope of graph of the forward current-forward voltage characteristic in the light source,
the control circuit being configured to set, when the current to be output to the light source is equal to or more than the specific value, the threshold voltage to a fixed value.

4. The light-emitting-diode-driving device according to claim 2,
wherein the control circuit is configured to set, when a current to be output to the light source is less than a specific value, the threshold voltage to be a lower voltage at a same current along the direction parallel with the slope of graph of the forward current-forward voltage characteristic in the light source,
the control circuit being configured to set, when the current to be output to the light source is equal to or more than the specific value, the threshold voltage to a fixed value.

5. The light-emitting-diode-driving device according to claim 1,
wherein the control circuit is designed to be electrically connected to a temperature detection unit that is configured to detect a temperature of the light source,
the control circuit being configured to perform, when the temperature detected by the temperature detection unit is more than a predetermined temperature, the constant current control with the DC-DC converter so as to reduce a current to be output to the light source.

6. A lighting apparatus for vehicle, comprising:
a light emitting diode; and
the light-emitting-diode-driving device according to claim 1 that is configured to turn on the light emitting diode as the light source.

7. A vehicle, comprising:
a light emitting diode;
the light-emitting-diode-driving device according to claim 1 that is configured to turn on the light emitting diode as the light source; and
a vehicle body in which the light emitting diode and the light-emitting-diode-driving device are provided.

8. A light-emitting-diode-driving device, comprising:
a DC-DC converter configured to convert, into a prescribed DC voltage, a DC voltage that is supplied from a DC power supply, and apply the prescribed DC voltage to a light source including a light emitting diode;
a current detection unit configured to detect a current that flows through the light source; and
a control circuit configured to perform constant current control with the DC-DC converter so that a value of the current detected by the current detection unit agrees with a prescribed reference current value to be supplied to the light source,
the control circuit comprising:
a reference-current-instruction unit configured to set the prescribed reference current value to be supplied to the light source;
a threshold-voltage-setting unit configured to set a threshold voltage for determining a short circuit failure in the light source;
a comparator circuit configured to compare, with the threshold voltage, a value of a voltage across the light source that is detected by a voltage detection unit; and
a power-supply-monitoring unit configured to output, to the reference-current-instruction unit, a signal for reducing the reference current value, when the DC voltage supplied from the DC power supply is less than a prescribed input voltage,
wherein the threshold-voltage-setting unit is configured to set the threshold voltage to be a lower voltage at a same current along a direction parallel with a slope of graph of a forward current-forward voltage characteristic in the light source, and
the control circuit is configured to make the threshold-voltage-setting unit reduce the threshold voltage, when the reference-current-instruction unit reduces the prescribed reference current value.

9. The light-emitting-diode-driving device according to claim 8,
wherein the control circuit is configured to make the threshold- voltage-setting unit reduce the threshold voltage, when detecting that the value of the current detected by the current detection unit is reduced below the prescribed reference current value.

10. The light-emitting-diode-driving device according to claim 8,
wherein the control circuit is configured to set, when a current to be output to the light source is less than a specific value, the threshold voltage to be a lower voltage at a same current along the direction parallel with the slope of graph of the forward current-forward voltage characteristic in the light source, the control circuit being configured to set, when the current to be output to the light source is equal to or more than the specific value, the threshold voltage to a fixed value.

11. The light-emitting-diode-driving device according to claim 9,
wherein the control circuit is configured to set, when a current to be output to the light source is less than a specific value, the threshold voltage to be a lower voltage at a same current along the direction parallel with the slope of graph of the forward current-forward voltage characteristic in the light source,
the control circuit being configured to set, when the current to be output to the light source is equal to or more than the specific value, the threshold voltage to a fixed value.

12. The light-emitting-diode-driving device according to claim 8,
wherein the control circuit is designed to be electrically connected to a temperature detection unit that is configured to detect a temperature of the light source,
the control circuit being configured to perform, when the temperature detected by the temperature detection unit is more than a predetermined temperature, the constant current control with the DC-DC converter so as to reduce a current to be output to the light source.

13. A lighting apparatus for vehicle, comprising:

a light emitting diode; and the light-emitting-diode-driving device according to claim 8 that is configured to turn on the light emitting diode as the light source.

14. A vehicle, comprising:

a light emitting diode;

the light-emitting-diode-driving device according to claim 8 that is configured to turn on the light emitting diode as the light source; and a vehicle body in which the light emitting diode and the light-emitting-diode-driving device are provided.

* * * * *